US012602102B2

(12) United States Patent
Mills

(10) Patent No.: US 12,602,102 B2
(45) Date of Patent: Apr. 14, 2026

(54) SELECTIVE BACKUP TO PERSISTENT MEMORY FOR VOLATILE MEMORY

(71) Applicant: SMART Modular Technologies, Inc., Newark, CA (US)

(72) Inventor: Andrew Mills, Coto de Caza, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 251 days.

(21) Appl. No.: 18/231,470

(22) Filed: Aug. 8, 2023

(65) Prior Publication Data

US 2025/0053219 A1 Feb. 13, 2025

(51) Int. Cl.
| | |
|---|---|
| *G06F 1/30* | (2006.01) |
| *G06F 1/3234* | (2019.01) |
| *G06F 11/1446* | (2026.01) |
| *G06F 12/02* | (2006.01) |
| *G06F 13/42* | (2006.01) |

(52) U.S. Cl.
CPC ............ *G06F 1/305* (2013.01); *G06F 1/3275* (2013.01); *G06F 11/1448* (2013.01); *G06F 12/02* (2013.01); *G06F 13/4221* (2013.01); *G06F 2213/0026* (2013.01)

(58) Field of Classification Search
CPC .... G06F 1/305; G06F 1/3275; G06F 11/1441; G06F 11/1448; G06F 11/2015; G06F 12/02; G06F 12/0238; G06F 13/4221; G06F 2212/7203; G06F 2213/0026
See application file for complete search history.

(56) References Cited

U.S. PATENT DOCUMENTS

| | | | |
|---|---|---|---|
| 9,383,934 B1 | 7/2016 | Lukacs et al. | |
| 9,696,940 B1 | 7/2017 | Neumann et al. | |
| 11,226,755 B1 | 1/2022 | Douglass et al. | |
| 2008/0270831 A1* | 10/2008 | Niwa .................... | G06F 11/141 714/15 |
| 2009/0327589 A1 | 12/2009 | Moshayedi | |
| 2014/0181373 A1* | 6/2014 | George .............. | G06F 12/0246 711/103 |
| 2018/0246647 A1* | 8/2018 | Sankaranarayanan ...................... | G06F 12/0246 |
| 2019/0361608 A1 | 11/2019 | Kim | |

(Continued)

OTHER PUBLICATIONS

CXL, "Compute Express Link™ (CXL™M) Specification," Revision 3.1, Aug. 2023, 1166 pages.

(Continued)

*Primary Examiner* — Tracy C Chan
(74) *Attorney, Agent, or Firm* — Withrow & Terranova, P.L.L.C.

(57) ABSTRACT

Systems and methods for selective backup to persistent memory from volatile memory are disclosed. In one aspect, a memory controller includes a detection circuit that detects an address for a memory access and determines a range into which that address falls. The memory controller also includes a touched map that is configured to store an indication as to what areas (or ranges) of memory have been accessed, as determined by the detection circuit. In the event of a command or power interruption, a backup routine initially consults the touched map and only backs up those ranges which have been touched. Such selective backup may reduce the amount of time and power required to make a backup, reducing the demands placed on a backup energy source.

14 Claims, 5 Drawing Sheets

(56)                    References Cited

U.S. PATENT DOCUMENTS

| | | | |
|---|---|---|---|
| 2022/0043724 | A1* | 2/2022 | Lee ........................ G06F 12/10 |
| 2022/0206904 | A1* | 6/2022 | Kim ..................... G06F 3/0637 |
| 2023/0152968 | A1* | 5/2023 | Kim ..................... G06F 3/0619 |
| | | | 711/103 |
| 2023/0350832 | A1* | 11/2023 | Lee ..................... G06F 13/4081 |
| 2024/0370322 | A1* | 11/2024 | Gorentla ............. H04L 49/9068 |

OTHER PUBLICATIONS

Non-Final Office Action for U.S. Appl. No. 18/239,376, mailed Sep. 6, 2024, 12 pages.

Notice of Allowance for U.S. Appl. No. 18/239,376, mailed Nov. 22, 2024, 10 pages.

Dell, Inc., "Dell EMC NVDIMM-N Persistent Memory User Guide," Revision A12, Aug. 2023, available from the Internet: [URL: https://www.dell.com/support/manuals/en-us/poweredge-r740xd/ nvdimm-n_ug_pub/battery?guid=guid-99d8f612-c316-48ce-a35b-eed2ba32d5d7&lang=en-us], 54 pages.

Snia, "NVDIMM Technical Brief: Solving Data Volatility," Jan. 2014, available from the Internet: [URL: https://www.snia.org/sites/ default/files/technical-work/whitepapers/SNIA-NVDIMM-Technical-Brief.pdf], 6 pages.

Posey, Brian, "Answer: When does storage snapshot technology work best?," Feb. 24, 2016, available from the Internet: [URL: https://www.techtarget.com/searchdatabackup/answer/When-does-storage-snapshot-technology-work-best], TechTarget, 3 pages.

Posey, Brian, "Definition: storage snapshot," Tech Accelerator, Feb. 2021, available from the Internet: [URL: https://www.techtarget. com/searchdatabackup/definition/storage-snapshot#:~:text=A% 20storage%20snapshot%20is%20a,they%20can%20roll%20back% 20to.], TechTarget, 6 pages.

Prasad, Somm, "Storage Snapshot Technology," Jul. 30, 2020, available from the Internet: [URL: https://www.geeksforgeeks.org/ storage-snapshot-technology/], GeeksforGeeks, 8 pages.

* cited by examiner

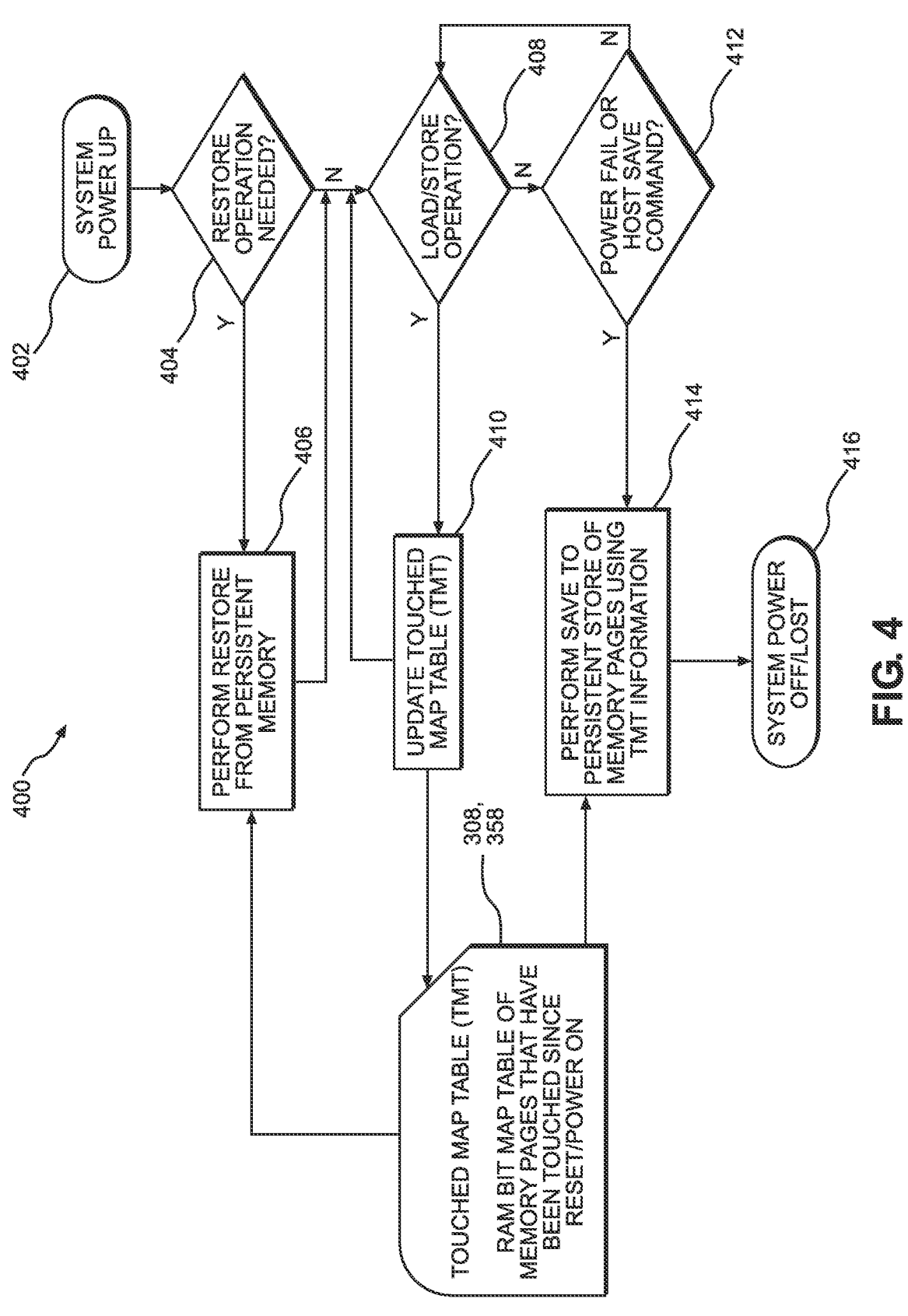

400

402 SYSTEM POWER UP

404 RESTORE OPERATION NEEDED?

406 PERFORM RESTORE FROM PERSISTENT MEMORY

408 LOAD/STORE OPERATION?

410 UPDATE TOUCHED MAP TABLE (TMT)

308, 358 TOUCHED MAP TABLE (TMT)

RAM BIT MAP TABLE OF MEMORY PAGES THAT HAVE BEEN TOUCHED SINCE RESET/POWER ON

412 POWER FAIL OR HOST SAVE COMMAND?

414 PERFORM SAVE TO PERSISTENT STORE OF MEMORY PAGES USING TMT INFORMATION

416 SYSTEM POWER OFF/LOST

FIG. 4

SELECTIVE BACKUP TO PERSISTENT MEMORY FOR VOLATILE MEMORY

BACKGROUND

I. Field of the Disclosure

The technology of the disclosure relates generally to memory devices and backup systems for such memory devices in the event of power loss or other trigger events, such as a command.

II. Background

Computing devices abound in modern society. The prevalence of these devices is driven in part by the many functions that are now enabled on such devices. Increased processing capabilities in such devices enable enhanced user experiences. With the advent of the myriad functions available to such devices, the size and complexity of the operating systems used to control the computing devices have increased. Likewise, there is a general trend for increasingly large and complex software applications. This increase in size and complexity requires more available memory to support the host processor. In general, most of the memory is volatile random-access memory (RAM). While volatile RAM is appropriate to meet speed, cost, and size requirements, its volatile nature makes long-term storage therein impractical. Accordingly, techniques have been developed to back up the volatile RAM to prevent complete data loss in the event of power failure or power interruption. As the size of the memory increases, there is room for innovation in how such backups are handled.

SUMMARY

Aspects disclosed in the detailed description include systems and methods for selective backup to persistent memory from volatile memory. In an exemplary aspect, a memory controller includes a detection circuit that detects an address for a memory access and determines a range into which that address falls. The memory controller also includes a touched map that is configured to store an indication as to what areas (or ranges) of memory have been accessed, as determined by the detection circuit. In the event of a command or power interruption, a backup routine initially consults the touched map and only backs up those ranges which have been touched. Such selective backup may reduce the amount of time and power required to make a backup, reducing the demands placed on a backup energy source.

In this regard, in one aspect, a memory device is disclosed. The memory device includes a volatile random-access memory (RAM) portion, a persistent memory portion, a touch map circuit configured to store information related to addresses detected by a detection circuit, and a backup memory controller. The backup memory controller is configured to detect a backup event and copy data from the volatile RAM portion to the persistent memory portion based on the information in the touch map circuit.

In another aspect, a method of backing up memory is disclosed. The method includes storing an indication of a memory access in a touch map circuit corresponding to a volatile memory portion and, after a backup event trigger, backing up only portions of the volatile memory portion based on indications in the touch map circuit.

BRIEF DESCRIPTION OF THE DRAWINGS

FIG. 4 is a flowchart illustrating an exemplary process for selectively backing up volatile memory into a persistent memory element.

DETAILED DESCRIPTION

Figure 1:
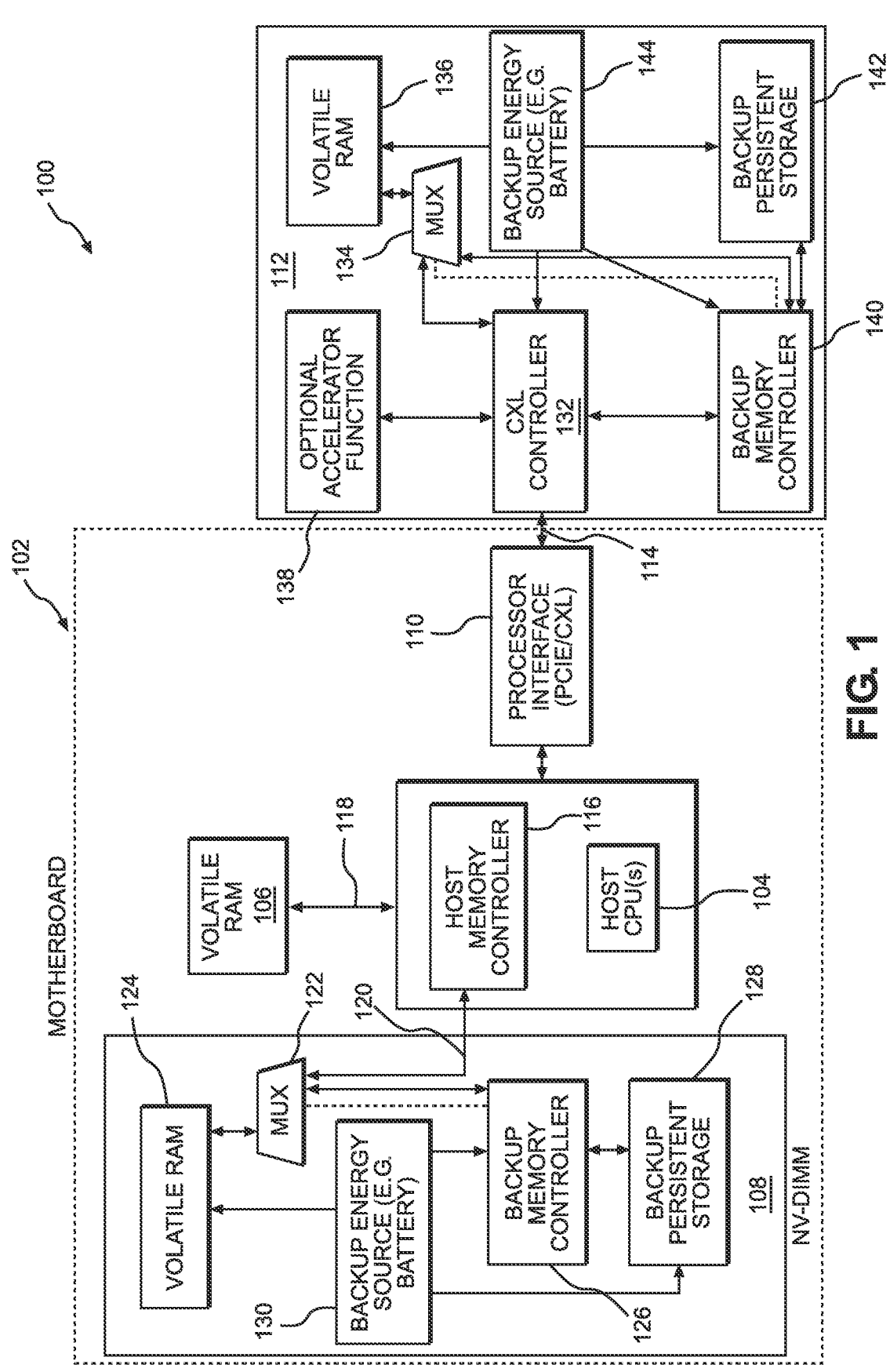
FIG. 1 is a block diagram of an exemplary computing device having a processor and volatile memory devices that have backup persistent memory elements.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for selective backup to persistent memory from volatile memory. In an exemplary aspect, a memory controller includes a detection circuit that detects an address for a memory access and determines a range into which that address falls. The memory controller also includes a touched map that is configured to store an indication as to what areas (or ranges) of memory have been accessed, as determined by the detection circuit. In the event of a command or power interruption, a backup routine initially consults the touched map and only backs up those ranges which have been touched. Such selective backup may reduce the amount of time and power required to make a backup, reducing the demands placed on a backup energy source.

In this regard, FIG. 1 is a block diagram of a computing device 100. The computing device 100 may include a motherboard 102. The motherboard 102 may have a host processor (also sometimes referred to as a computer processing unit (CPU)) 104, a first local memory 106, and a second local memory 108. In some devices, there may be multiple host processors 104. The motherboard 102 may also have a communication interface 110 (sometimes called a processor interface) that allows communication to an external memory 112 through a bus 114. In an exemplary aspect, the bus 114 may be a peripheral component interconnect express (PCIe) bus, a compute express link (CXL) bus, or a CXL protocol over a PCIe physical layer.

The host processor 104 may include a host memory controller 116 that communicates with the first local memory 106 through a first internal memory bus 118. The host memory controller 116 may further communicate with the second local memory 108 through a second internal memory bus 120. The first local memory 106 may be formed from volatile random-access memory (RAM).

The second local memory 108 may include a multiplexer (mux) 122 that provides access to a volatile RAM 124. The mux 122 also communicates with a backup memory controller 126. The backup memory controller 126 is coupled to a persistent memory 128. The persistent memory 128 may also be coupled to a backup energy source (e.g., battery) 130. At the command of the host memory controller 116, or on detection of power loss, the backup memory controller 126 may cause the information in the volatile RAM 124 to be copied into the persistent memory 128.

Similarly, the external memory 112 may have a bus interface (not shown) that sends and receives signals over the bus 114. Received signals are passed to a control circuit 132 (or the interface may be integrated into the control circuit 132) (sometimes referred to as a controller or CXL controller) and pass through a mux 134 to a volatile RAM 136. Optionally, an accelerator circuit 138 may be present to provide offloaded computational support from the primary host CPU(s) 104 by directly accessing and processing the data stored in RAM 136. The external memory 112 may further have a backup memory controller 140. The backup memory controller 140 may be coupled to a persistent memory 142. The persistent memory 142 may also be coupled to a backup energy source (e.g., battery) 144. At the command of the host memory controller 116, or on detection of power loss, the backup memory controller 140 may cause information in the volatile RAM 136 to be copied into the persistent memory 142.

The conventional way of copying into persistent memory 128 or 142 is set forth in the process illustrated by FIG. 2 and described below. The improvements of the present disclosure begin below with reference to FIG. 3A.

Figure 2:
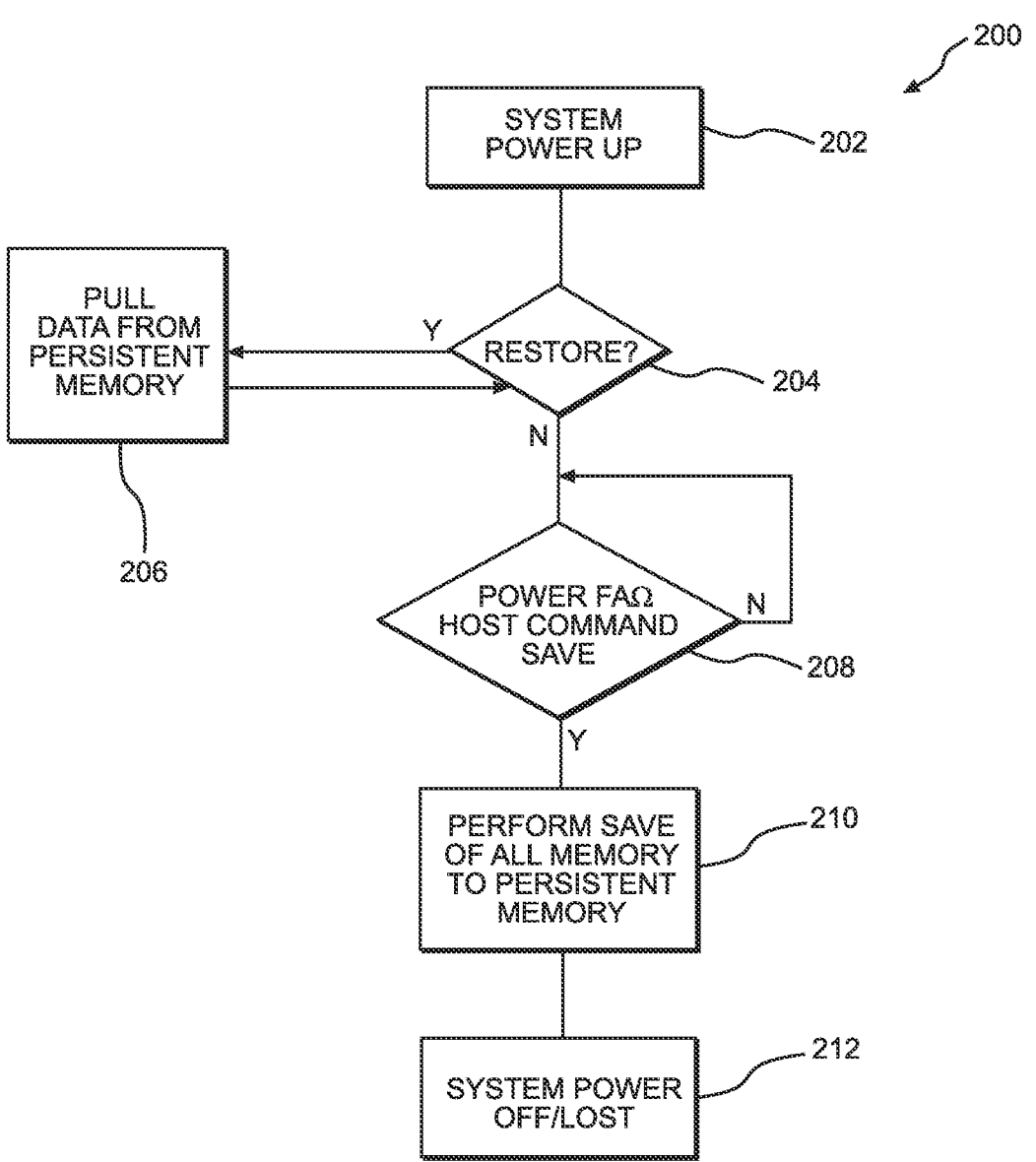
FIG. 2 is a flowchart of a conventional backup process that may be used to backup volatile memory devices.

In this regard, FIG. 2 illustrates a process 200 that begins on system power up (block 202) (assuming the use of second local memory 108, although a similar process is used for external memory 112). The control circuit (e.g., the host processor 104) may determine if a restore operation is needed (block 204). If the answer to block 204 is yes, the host memory controller 116 pulls data from the persistent memory 128 (block 206) to the volatile RAM 124, while additionally signaling to the host CPU(s) 104 to hold off accessing the volatile RAM 124 until the pull is complete. If the answer to block 204 is no, or after data has been pulled from persistent memory 128 to the volatile RAM 124, the backup memory controller 126 will monitor for receipt of a command to backup or detection of a power fail condition (block 208). So long as the answer to block 208 is no, normal operation continues. Once the answer to block 208 is yes, the backup memory controller 126 causes the entirety of the volatile RAM 124 to be saved into persistent memory 128 (block 210) using the backup energy source 130 to provide power long enough for the save function to complete. After such a save has completed, the system may power off or disconnect the battery in the backup energy source 130 (block 212).

In many cases, the volatile RAM 124 may be quite large to assist in supporting the complex software that is currently in use. Thus, a save command (whether active from the host controller or as a result of power loss) that copies the entirety of the volatile RAM 124 to persistent memory 128 may be both time-consuming and power intensive. The backup energy source 130 must then be designed for a worst-case scenario that allows for such a lengthy save process.

Exemplary aspects of the present disclosure add a detection circuit to the memory as well as a record of what portions of the volatile RAM have been accessed since the last backup. That is, when the detection circuit detects that a portion of the volatile RAM has been accessed, the detection circuit causes the record to be updated to reflect this access. Then, when a memory controller commands a backup or a power loss condition is detected, the backup memory controller may use the record to copy only those portions of the volatile RAM that have been accessed to the persistent memory. By copying only the portions of the volatile RAM that have been accessed (i.e., the "touched portions"), the amount of time needed to copy is reduced with an appurtenant reduction in power required from the backup energy source.

Figure 3A:
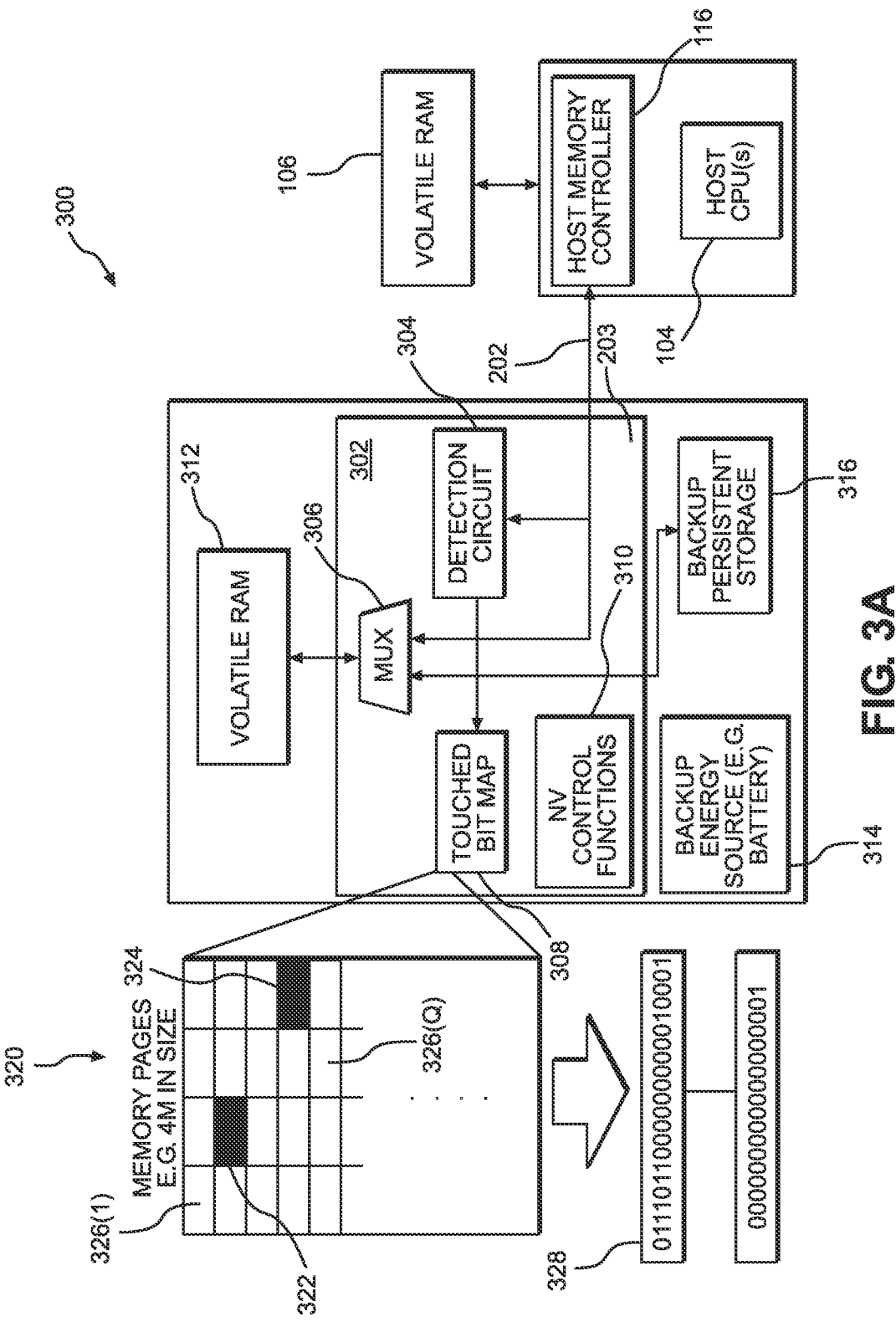
FIG. 3A is a block diagram of a computing device with a local memory device having a controller according to exemplary aspects of the present disclosure.
Figure 3B:
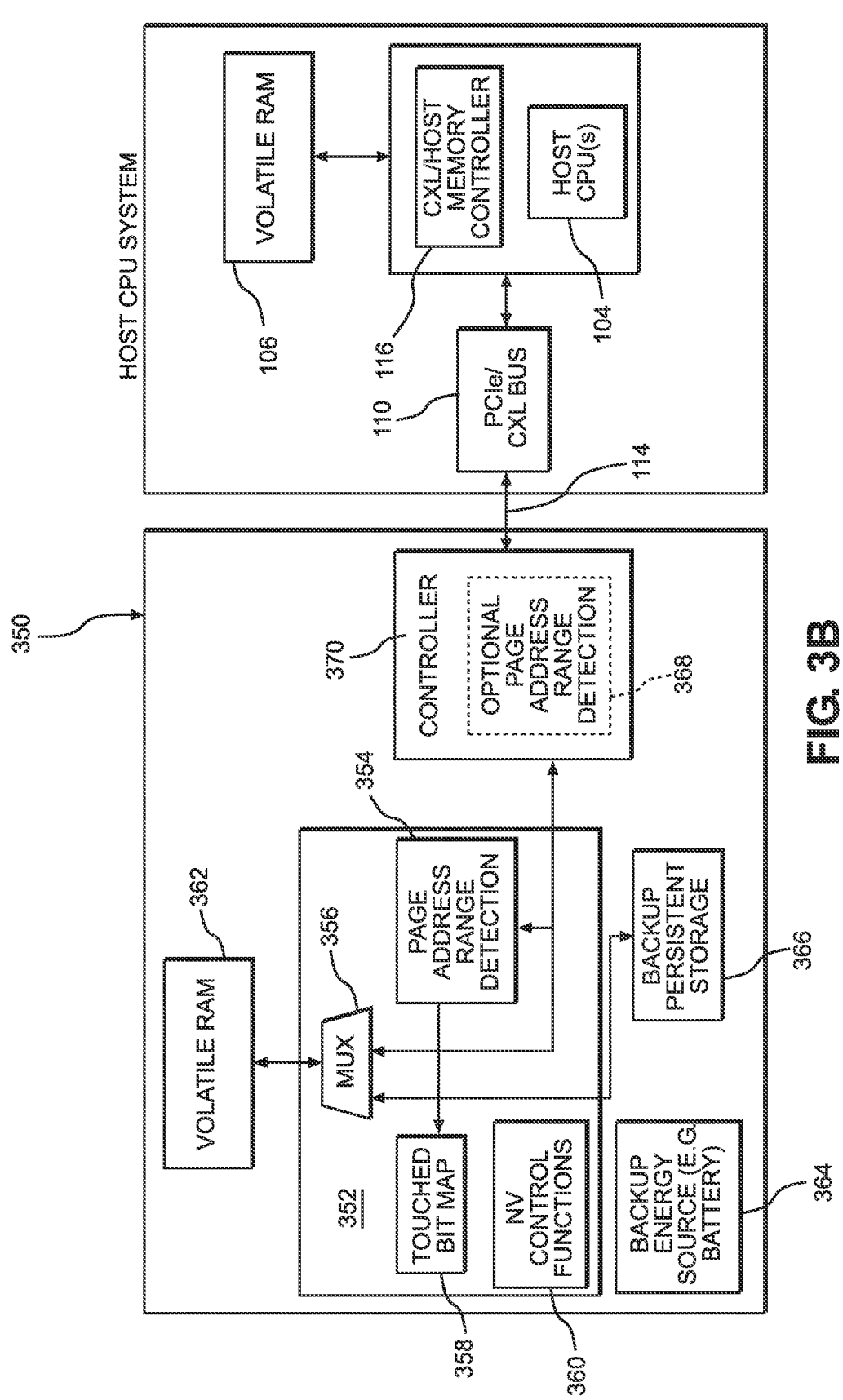
FIG. 3B is a block diagram of a computing device with a remote memory device having a controller according to exemplary aspects of the present disclosure.

FIGS. 3A and 3B show two possible exemplary memory structures that have such a detection circuit along with a "touched map" for recording the portions of the volatile RAM that have been accessed. In this regard, FIG. 3A shows a memory 300 that may, for example, be an internal memory, such as second local memory 108. The memory 300 may have a control circuit, more specifically, a backup memory controller 302 that includes a detection circuit 304, a mux 306 (analogous to mux 122 of FIG. 1), a touched bit map circuit 308, and a nonvolatile control function circuit 310. The memory 300 may further include a volatile RAM 312, a backup energy source 314, and a backup persistent memory 316. When the host memory controller 116 writes to the volatile RAM 312, the detection circuit 304 detects the command and may extract an address from the command. Based on this address, the detection circuit 304 may determine a portion or range of the volatile RAM 312 that has been accessed. For example, for a one-terabyte volatile RAM 312, the entirety of the terabyte may be conceptually broken into four-megabyte portions. It should be appreciated that other ranges or sizes of portions may be used without departing from the present disclosure. Based on the address, the detection circuit 304 may determine that a given portion or range has been accessed and store that "touch" in the touched bit map circuit 308.

Exploded portion 320 illustrates the concept of a portion 322 or 324 that has been accessed compared to portions 326(1)-326(Q) that have not been accessed. This graphical representation may be simplified to a string 328 of ones and zeros, where a one may indicate that the portion has been touched.

Similarly, FIG. 3B shows a memory 350 that may be external memory, such as external memory 112 of FIG. 1. In an exemplary aspect, the external memory may be a non-volatile dual in-line memory module (NV-DIMM) or RAM stick, or a nonvolatile CXL memory device. The memory 350 may have a backup memory controller 352 that includes a detection circuit 354, a mux 356 (analogous to mux 134 of FIG. 1), a touched bit map circuit 358, and a nonvolatile control function circuit 360. The memory 350 may further include a volatile RAM 362, a backup energy source 364, and a backup persistent memory 366. When the host memory controller 116 writes to the volatile RAM 362, the detection circuit 354 detects the command and may extract an address from the command. Based on this address, the detection circuit 354 may determine a portion or range of the volatile RAM 362 that has been accessed. For example, for a one terabyte volatile RAM 362, the entirety of the terabyte may be conceptually broken into four-megabyte portions (again, this size and range are arbitrary and may be varied without departing from the present disclosure). Based on the address, the detection circuit 354 may determine that a given portion or range has been accessed and store that "touch" in the touched bit map circuit 358.

Note that instead of having detection circuit 354 in the backup memory controller 352, a detection circuit 368 may be present in CXL control circuit 370.

A process 400 for using the selective backup of volatile memory to persistent memory is provided with reference to FIG. 4. The process 400 begins with a system power up (block 402). The host memory controller 116 determines if a restore operation is needed (block 404). If the answer to block 404 is yes, then the host memory controller 116 commands a restore from persistent memory 316, 366

(block 406). Optionally, the restore may reference the touched bit map circuit 308, 358 and only restore those portions which were touched. Alternatively, the entirety of the persistent memory 316, 366 is copied back to the volatile RAM 312, 362. After restore (or if no restore was needed at block 404), the process 400 continues with load and store commands being issued to the volatile RAM 312, 362 (block 408). The detection circuit 304, 354 (or 368) detects these load and store commands and updates the touched bit map circuit 308, 358 (block 410) each time such a command issues. If such a command has not issued, the backup memory controller 302 or 352 monitors for a backup command or power failure (block 412). If there is no such occurrence, the process 400 repeats as noted. If, however, there is such an occurrence, then the backup memory controller 302 or 352 causes the portions of the volatile RAM 312, 362 indicated in the touched bit map circuit 308, 358 to be saved to persistent memory 316, 366 (block 414) and the process 400 concludes with a system power off (block 416).

As a contemplated variation, instead of backing up only the touched portion, the memory controller 302 or 352 compares the amount of touched memory to a threshold and, if the threshold is exceeded, does a complete restore. For example, if the host memory controller 116 orders a restore, the backup memory controller 302, 352 compares the touched bit map circuit 308, 358 to a threshold. If, for example, 80% of the memory has been touched, it may be more efficient to do a full restore and a full restore is done. Otherwise, if the threshold is not exceeded, the restore may only use the touched portions. While 80% is specifically contemplated, other thresholds ranging from 55% to 99% may be used.

The systems and methods for selective backup of volatile memory to persistent memory, according to aspects disclosed herein, may be provided in or integrated into any processor-based device. Examples, without limitation, include a server, a storage server, a desktop computer, a laptop computer, or the like, as well as more specialized processor-based devices such as a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, a wearable computing device (e.g., a smartwatch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, or the like.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A memory device comprising:
a communication interface configured to couple to a bus and allow communication with a host controller therethrough, wherein the communication interface comprises a compute express link (CXL) interface and the communication is compliant with the CXL protocol;
a volatile random-access memory (RAM) portion;
a persistent memory portion;
a touch map circuit configured to store information related to addresses detected by a detection circuit; and
a backup memory controller configured to:
detect a backup event; and
copy data from the volatile RAM portion to the persistent memory portion based on the information in the touch map circuit;
receive a memory restore command from a host memory controller; and
responsive to receiving the memory restore command, determine when the portions of the volatile memory indicated in the touch map circuit exceed a threshold, and responsive to the threshold being exceeded, restore all the volatile memory portion.

2. The memory device of claim 1, further comprising a detection circuit configured to detect an address in a memory access command that accesses the volatile RAM portion.

3. The memory device of claim 2, wherein the backup memory controller configured to detect a backup event is configured to detect a power loss or interruption event.

4. The memory device of claim 1, further comprising a backup energy source configured to supply power to the volatile RAM portion during a power loss event.

5. The memory device of claim 1, wherein the memory device comprises a nonvolatile dual in-line memory module (NV-DIMM) stick.

6. The memory device of claim 1, wherein the information corresponds to a bit that represents a range of addresses in the volatile RAM portion.

7. The memory device of claim 1, wherein the touch map circuit is configured to store the information as a string of bits representing ranges of addresses that have been accessed.

8. The memory device of claim 1, wherein the communication interface comprises a detection circuit configured to detect an address in a memory access command that accesses the volatile RAM portion.

9. A method of backing up memory, comprising:
storing an indication of a memory access in a touch map circuit corresponding to a volatile memory portion;
after a backup event trigger, backing up only portions of the volatile memory portion based on indications in the touch map circuit;
receiving a memory restore command from a host memory controller; and
responsive to receiving the memory restore command, determining when the portions of the volatile memory indicated in the touch map circuit exceed a threshold, and responsive to the threshold being exceeded, restoring all the volatile memory portion.

10. The method of claim 9, wherein receiving the memory access request comprises receiving the memory access request across a compute express link (CXL) bus and the memory access request is compliant with the CXL protocol.

11. The method of claim 9, further comprising detecting an address associated with the memory access.

12. The method of claim 11, wherein storing the indication, is based on the detecting.

13. The method of claim 9, wherein storing the indication comprises storing an indication that an address in a range of addresses has been accessed.

14. The method of claim 9, wherein, responsive to the memory restore command, restoring the portions of the volatile memory portion indicated in the touch map circuit.

* * * * *